June 30, 1942.　　　R. ERLING　　　2,288,076
STEERING GEAR FOR SHIPS
Filed Sept. 2, 1938　　　5 Sheets-Sheet 1
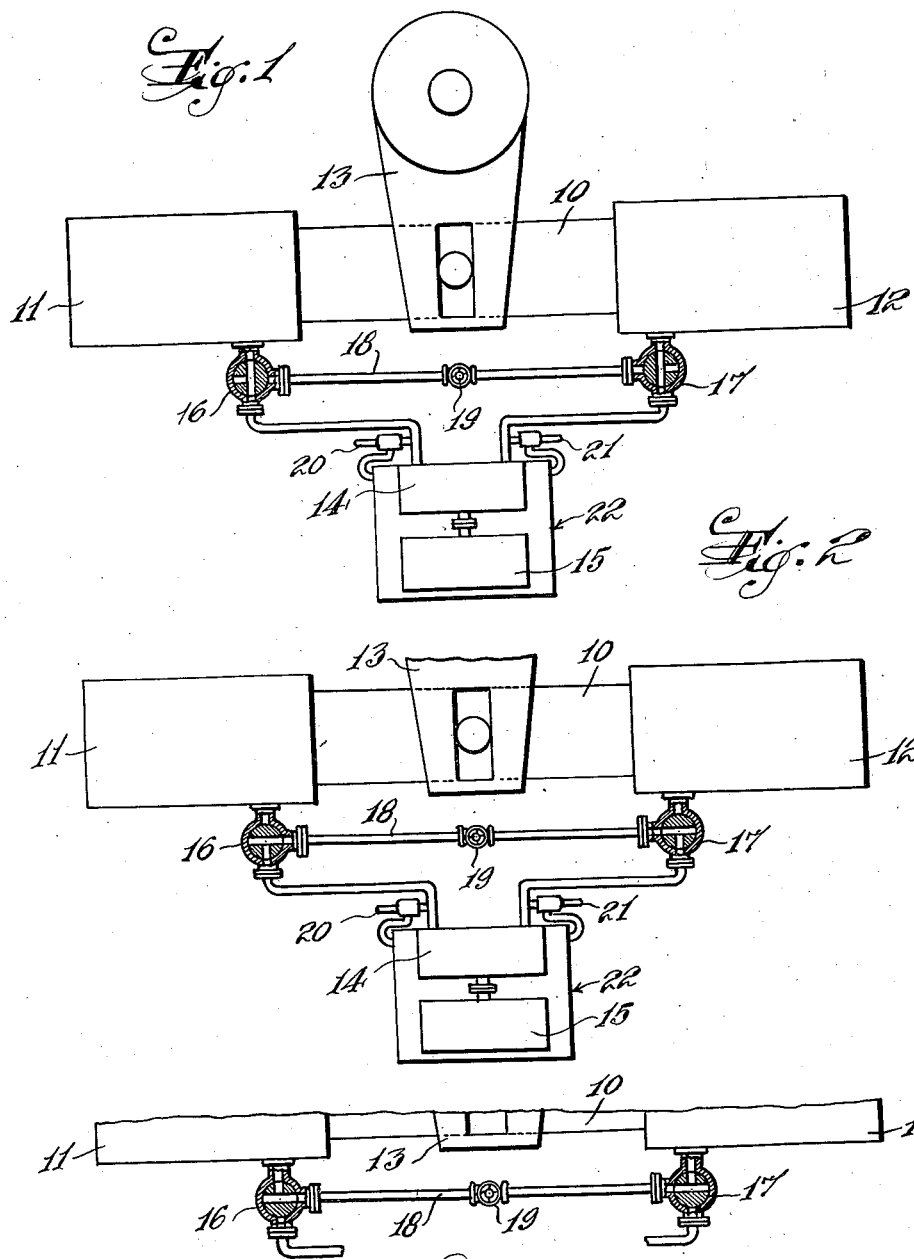

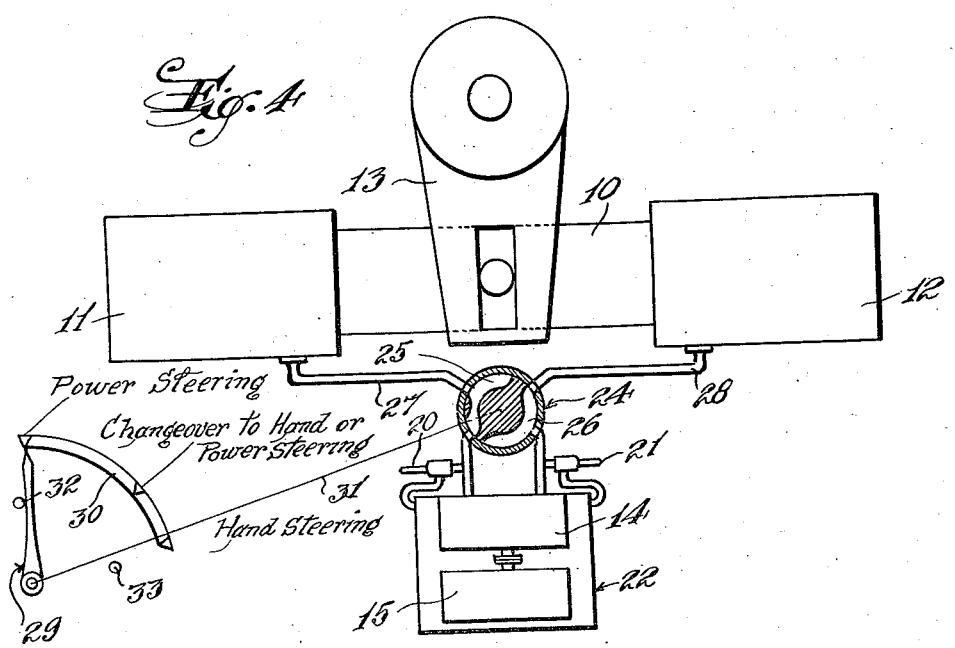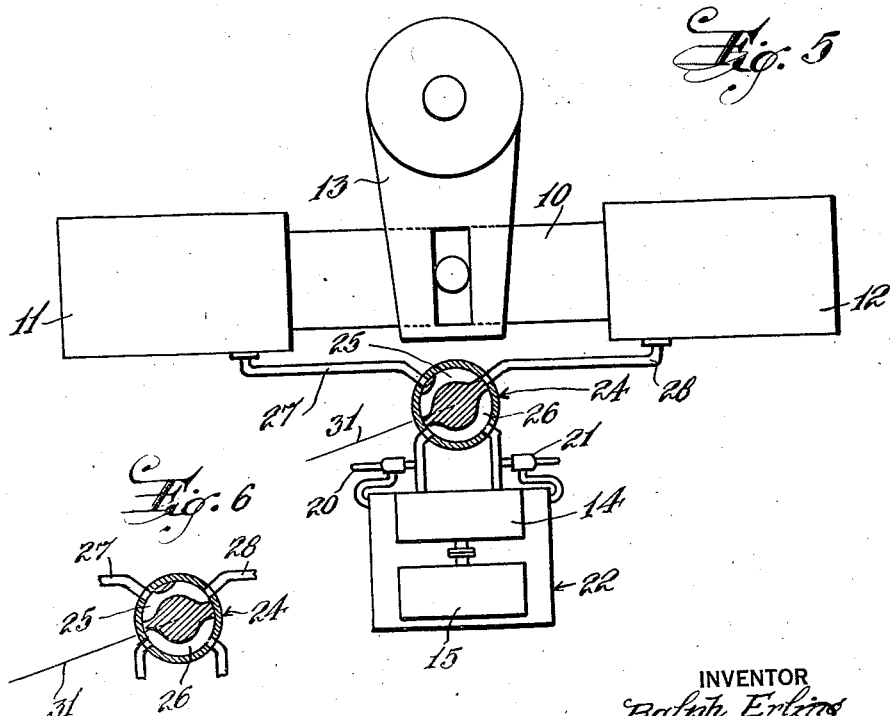

June 30, 1942.  R. ERLING  2,288,076
STEERING GEAR FOR SHIPS
Filed Sept. 2, 1938  5 Sheets-Sheet 3
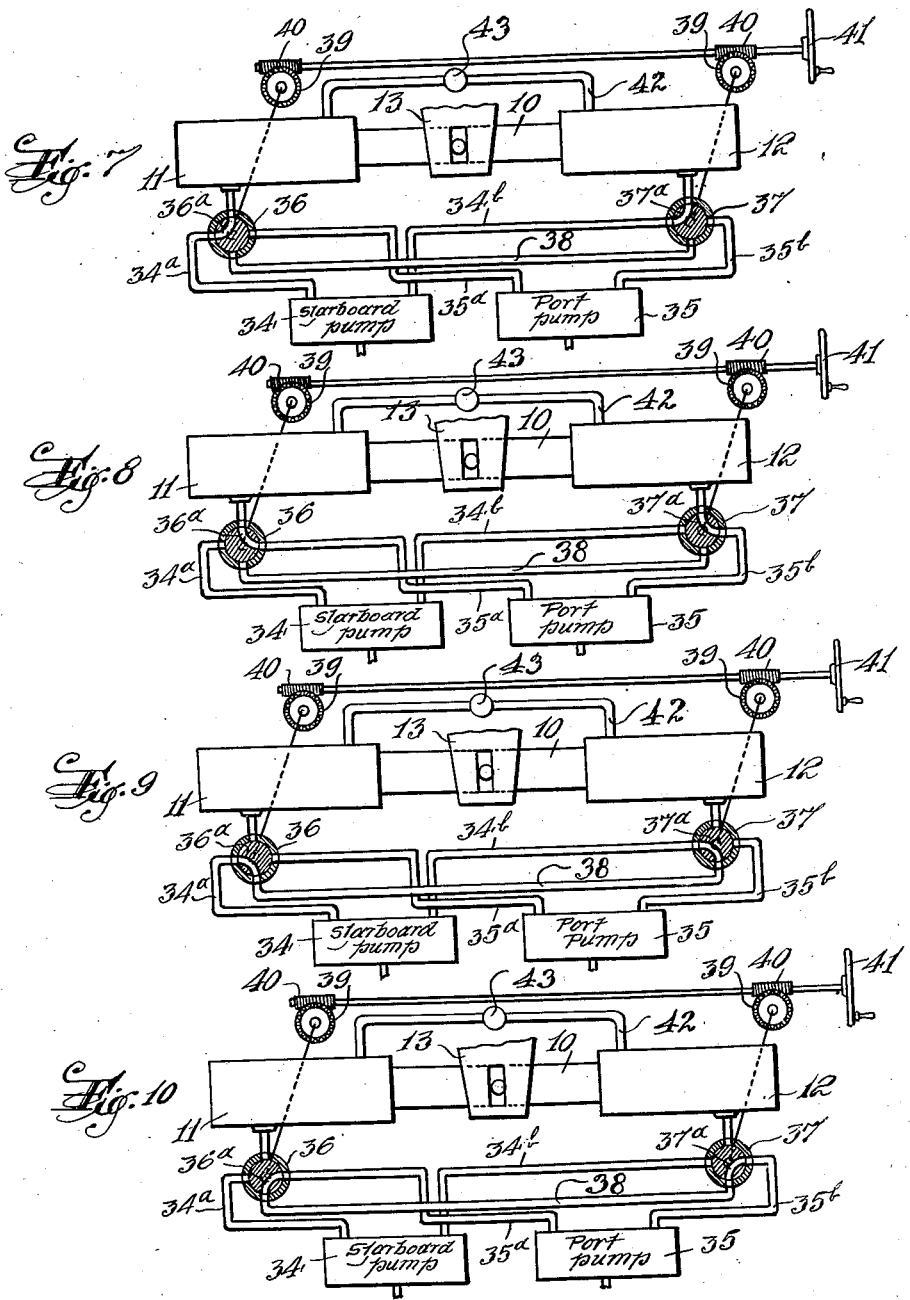

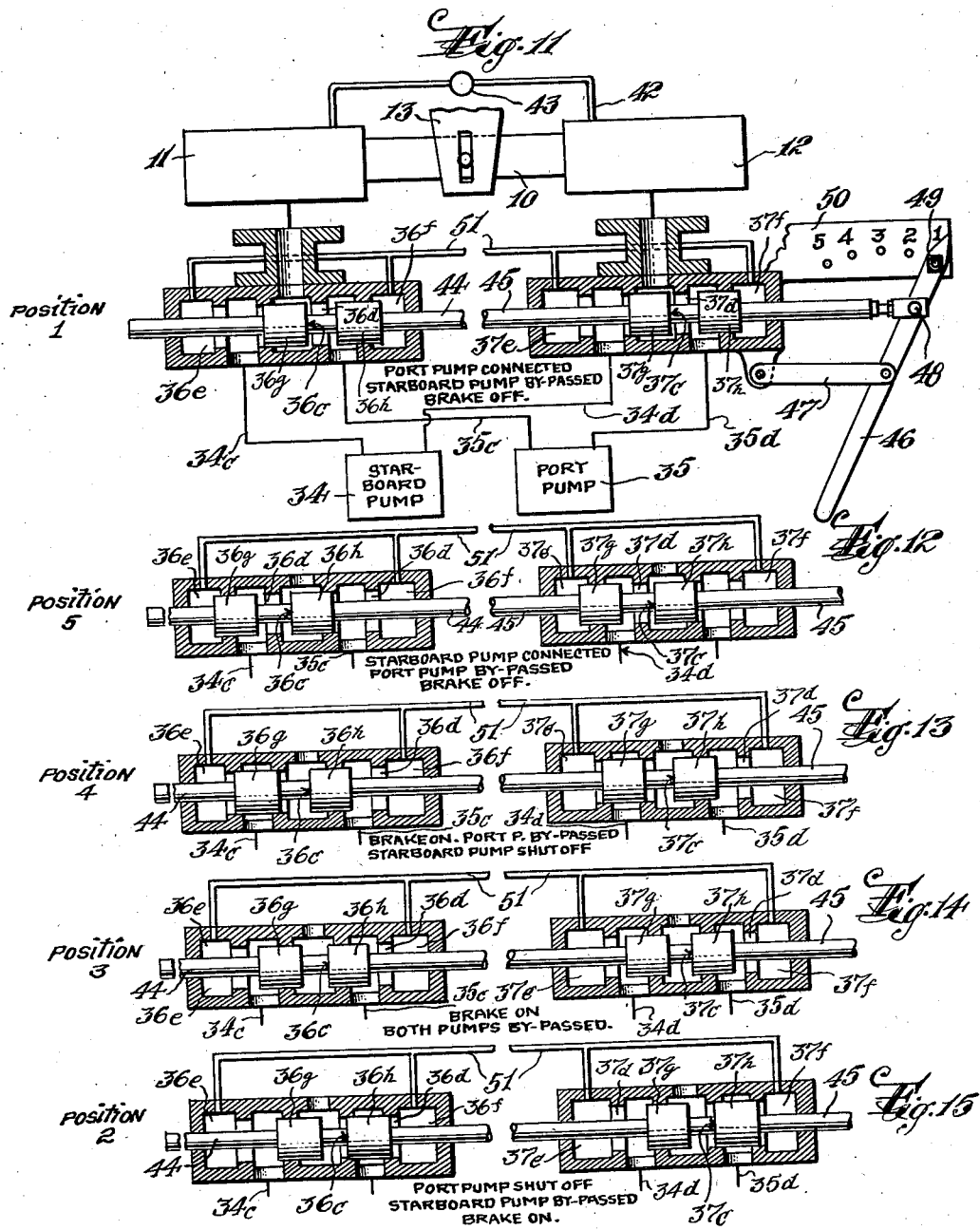

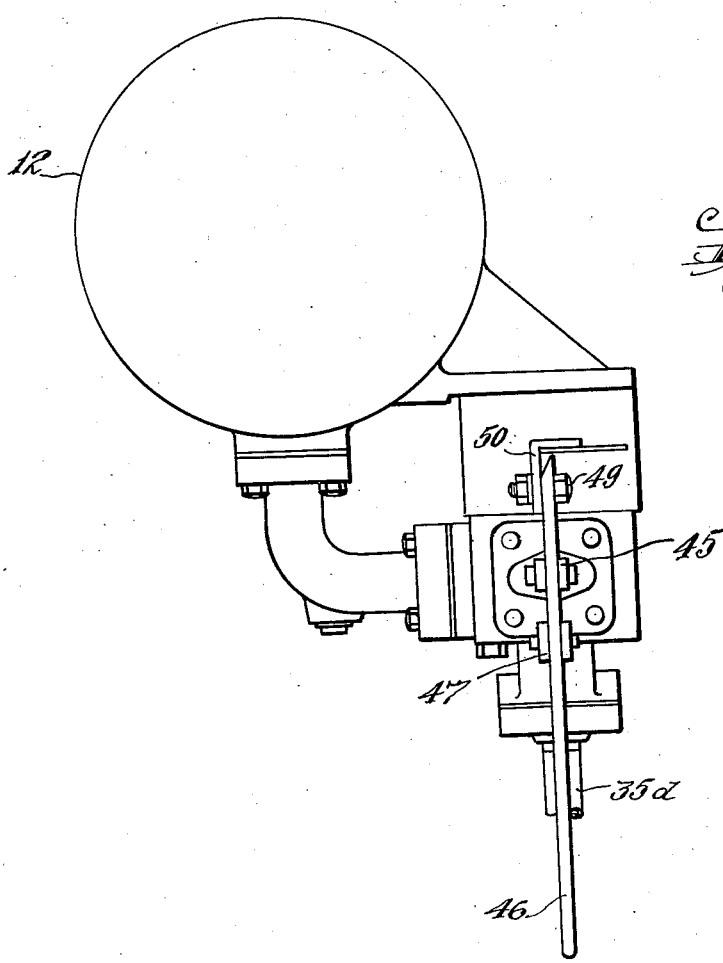

Patented June 30, 1942

2,288,076

UNITED STATES PATENT OFFICE 2,288,076

STEERING GEAR FOR SHIPS

Ralph Erling, Cranford, N. J., assignor to Lidgerwood Manufacturing Company, Elizabeth, N. J., a corporation of New Jersey Application September 2, 1938, Serial No. 228,121

3 Claims. (Cl. 60—52)

My invention relates to improvements in steering gear for ships.

In hydraulic steering gear of the general type disclosed in my Patent No. 2,028,089, issued January 14, 1936, mechanical brakes have been used to brake or hold the rudder and the rudder crosshead stationary in changing over from power to hand steering or vice versa, or in transferring from one power plant to another. These mechanical brakes were massive and required considerable effort to operate them.

With the foregoing in mind, it is one of the objects of my invention to provide improved steering gear in which the matter of braking can be accomplished easily and quickly, and only involves the actuation of valves.

Other objects and advantages will hereinafter appear.

For the purpose of illustrating my invention, several embodiments thereof are shown in the drawings, in which Figure 1 is a simplified, plan view, partly in section, of maritime steering gear constructed and operating in accordance with my invention;

Figs. 2 and 3 are views similar to Fig. 1, showing different phases in the operating action;

Figs. 4, 5 and 6 are views similar, respectively, to Figs. 1, 2 and 3, and showing a modification;

Figs. 7, 8, 9 and 10 are views similar to Fig. 1, showing different phases in the operating action of steering gear embodying two independent power plants and operating in accordance with my invention;

Figs. 11 to 15 are views similar to Figs. 7 to 10, showing another modification, and Fig. 16 is an end, elevational view, looking toward the left in Fig. 11.

In Figs. 1, 2 and 3, the reference numeral 10 designates the conventional ram which is slidable in the complementary and oppositely-directed cylinders 11 and 12 and is connected to the rudder crosshead 13.

A variable-stroke pump 14 of a suitable, conventional construction is driven by an electric motor 15 and operates to supply oil under pressure to the cylinders 11 and 12 selectively in the well known manner to impart movement one way or the other to the crosshead.

Three-way cocks 16 and 17 are connected as shown in the piping from the pump to cylinders 11 and 12, respectively. A pipe 18 connects the three-way cocks, and a shut-off valve 19 may be located in this pipe.

The variable-stroke pump, which is of a conventional construction as stated, is rotated always in the same direction by the motor 15 and operates in the well-known manner. That is, the pump is provided with the usual control means to change the direction of oil delivery therefrom. Operation of the control means in one direction causes the pump to deliver oil through valve 16 to cylinder 11, and the oil in cylinder 12 to flow through valve 17 back to the pump. Operation of the control means in the opposite direction causes the pump to deliver oil through valve 17 to cylinder 12, and the oil in cylinder 11 to flow through valve 16 back to the pump. This operating action all takes place without changing the position of valves 16 and 17 as shown in Fig. 1, for power steering.

Relief valves 20 and 21, which discharge into the sump tank 22, operate to relieve the pressure in the system above a predetermined pressure.

When the steering gear is in normal operation for power steering, the three-way cocks 16 and 17 are open as shown in Fig. 1, allowing oil to flow from the pump to the cylinders 11 and 12, or from the cylinders back to the pump. At this time, also, the valve 19 is closed so that in the event of leakage in the three-way cocks, oil cannot pass between the cylinders.

When hand steering is to be used, the valve 19 is opened and the three-way cocks 16 and 17 moved to the positions shown in Fig. 2. With the valve 19 open, the pipe 18 provides a by-pass around the pump 14 so that if the motor 15 is not shut down immediately after the three-way cocks are moved to the positions shown in Fig. 2, the oil pumped is simply by-passed and no pressure builds up in the pump. The oil is now trapped in each of the cylinders, thereby to prevent the flow of the oil into and from the latter to apply the hydraulic brake and retain the crosshead 13 in substantially the position thereof at the time. The motor 15 is now shut down, if this has not already been done, and the transfer made to hand steering, after which the three-way cocks 16 and 17 are moved to the positions shown in Fig. 3.

With the three-way cocks in the positions shown in Fig. 3, both cylinders 11 and 12 are isolated from the pump 14 and a by-pass passage is provided by way of the open valve 19 for the free flow of oil from either of the cylinders 11 and 12 to the other during hand steering.

In changing back to power steering, the valve 19 is closed to trap the oil in each of the cylinders 11 and 12 and apply a hydraulic brake to the crosshead 13 until the hand-steering mechanism or tackle is removed. The motor 15 is now started up, and the three-way cocks are moved back to the positions thereof shown in Fig. 1.

The embodiment of my invention shown in Figs. 4, 5 and 6 is the same as that shown in Figs. 1, 2 and 3, except that a single, four-way valve 24 is used in lieu of the three-way cocks 16 and 17 and the by-pass valve 19.

When the steering gear is in normal operation, for power steering, the valve 24 is in the position shown in Fig. 4, allowing oil to flow between the pump 14 and cylinder 11 by way of the valve passage 25 and between the pump and cylinder 12 by way of the valve passage 26. The position of valve 24 in Fig. 4 corresponds to the position of valves 16, 17 and 19 in Fig. 1.

When hand steering is to be used, the valve 24 is moved to the position shown in Fig. 5, whereat the solid portions of the valve shut off the pipe connections 27 and 28 from the pump to the cylinders 11 and 12, respectively. Also, with the valve 24 in the position shown in Fig. 5, the valve passage 26 provides a by-pass around the pump 14 so that if the motor 15 is not shut down immediately after the valve 24 is moved to the position in Fig. 5, the oil pumped is simply by-passed and no pressure builds up in the pump. The oil is now trapped in each of the cylinders, thereby to prevent the flow of the oil into and from the latter to apply the hydraulic brake and retain the crosshead 13 in substantially the position thereof at the time. The motor 15 is now shut down, if this has not already been done, and the transfer made to hand steering, after which the valve 24 is moved to the position shown in Fig. 6. The position of valve 24 in Fig. 5 corresponds to the position of valves 16, 17 and 19 in Fig. 2.

With the valve 24 in the position shown in Fig. 6, both cylinders 11 and 12 are isolated from the pump 14 and a by-pass passage is provided by way of the valve passage 25 for the free flow of oil from either of the cylinders 11 and 12 to the other during hand steering. Also, in this position of the valve 24, the by-pass around the pump 14 is still retained by the valve passage 26. The position of valve 24 in Fig. 6 corresponds to the position of valves 16, 17 and 19 in Fig. 3.

In changing back to power steering, the valve 24 is moved from the position shown in Fig. 6 to that shown in Fig. 5 to again trap the oil in each of the cylinders 11 and 12 and apply a hydraulic brake to the crosshead 13 until the hand-steering mechanism or tackle is removed. The motor 15 is now started up, and the valve 24 moved to the position shown in Fig. 4 for power steering.

For the purpose of showing the three different positions of the valve 24, a suitable indicator may be employed. In Fig. 4, this is shown as being in the form of an indicating pointer 29 movable over a scale 30 and fixed for rotation with the valve stem, as represented by the line 31. Stops 32 and 33 may be provided to limit movement of the valve to the two operating positions thereof shown in Figs. 4 and 6, respectively, and the scale 30 may bear appropriate designations, as shown, to inform the operator when the valve is in the correct position for power steering, or for changeover to hand or power steering as the case might be, or for hand steering. Similar indicating means may be used in connection with the valves 16 and 17 in Figs. 1, 2 and 3.

In the embodiment of my invention shown in Figs. 7, 8, 9 and 10, two independent power plants 34 and 35 are provided, either one of which may be used. Each pump has its own piping to each cylinder, with change-over valves 36 and 37 located at the cylinders and arranged for simultaneous operation. A pipe 38 connects the two valves, as shown.

In Fig. 7, the port pump 35 is shut down and the starboard pump 34 is operating and is connected to the cylinder 11 by the pipe 34a and the valve passage 36a and is connected to the cylinder 12 by the pipe 34b and the valve passage 37a. If the power plant 34 fails, or for any other reason it is desired to change over to the pump 35, the valves 36 and 37 are moved to the positions shown in Fig. 8. The port pump 35 is now connected to the cylinder 11 by the pipe 35a and the valve passage 36a and is connected to the cylinder 12 by the pipe 35b and the valve passage 37a.

In case of failure of both pumps 34 and 35, it is desirable that the rudder be held, and to accomplish this the valves are moved to the positions shown in either Fig. 9 or Fig. 10, depending upon which pump was used last.

With the valves in the respective positions shown in Fig. 9, oil is trapped in each of the cylinders 11 and 12, thereby to prevent the flow of the oil into and from the latter to apply the hydraulic brake and retain the crosshead 13 in substantially the position thereof at the time. Also, a by-pass around pump 34 is now provided by way of pipe 34a, valve passage 36a, pipe 38, valve passage 37a and pipe 34b so if the pump 34 is still operating the oil pumped is simply by-passed and no pressure builds up.

With the valves 36 and 37 in the respective positions shown in Fig. 10, a by-pass around pump 35 is provided by way of pipe 35a, valve passage 36a, pipe 38, valve passage 37a and pipe 35b. Also, the oil is trapped in each of the cylinders 11 and 12 to cause application of the hydraulic brake on the crosshead 13. If pump 35 is still operating, no pressure builds up on account of the by-pass around this pump.

From the foregoing it will be seen that either of the pumps 34 and 35 can be selected for service by moving the valves to the respective positions shown in Fig. 7 or in Fig. 8, and that if both pumps fail, the rudder crosshead can be held stationary by moving the valves to the positions shown in either Fig. 9 or Fig. 10.

It will be seen, further, that when either the starboard valve 36 is in the position thereof shown in Fig. 9, or the port valve 37 is in the position thereof shown in Fig. 10, the by-pass pipe 38 is open for the starboard or port pump, respectively. This permits starting up the respective pump before releasing the brake, so that as the brake is released the pump being used will automatically hold the rudder.

For hand steering, an independent by-pass pipe 42 with shut-off valve 43, connects the two cylinders, the valve 43 being closed for power steering and open for hand steering.

For the purpose of actuating the valves 36 and 37 simultaneously and in perfect unison, worm gears 39 may be fixed with respect to the valve stems, as represented in the drawing. The worm gears are rotated by worms 40 turned by a common hand-wheel or crank 41. Similar mechanism may be used in Figs 1, 2 and 3 for turning the valves 16 and 17 simultaneously and in unison.

In the embodiment of my invention shown in Figs. 11 to 16 there are the two independent power plants 34 and 35 as in Figs. 7 to 10, either one of which may be used. Each pump has its own piping to each of the cylinders 11 and 12, with change-over piston valve 36c and 37c corresponding, respectively, to the rotary valves 36 and 37 in Figs. 7 to 10. The valves 36c and 37c are aligned as shown, and are located at the cylinders and have the adjacent ends of their respective rods 44 and 45 connected by suitable coupling means (not shown).

A common valve-actuating lever 46 is pivotally connected to one end of a link 47 whose other end is pivotally connected to the housing of valve 37c. The lever 46 is pivotally connected at 48 to the adjacent end of the valve rod 45. With the lever 46 in the position shown in Fig. 11 the valves are in the first position thereof, and are held in this position by a bolt 49 passing through registering openings in the upper end of the lever and a dial plate 50 rigid with respect to the housing of valve 37c. By movement of the lever 46 in the counter-clockwise direction, the valves are simultaneously placed in the second, third, fourth and fifth positions thereof, as shown in Figs. 15, 14, 13 and 12, respectively. The plate 50 is provided with as many holes to receive the bolt 49 for the purpose of holding the valves in these positions.

With the valves in the first position shown in Fig. 11, the port pump 35 is operating and is connected to the cylinder 11 by a pipe represented by the line 35c and through the valve passage 36d, and is connected to the cylinder 12 by a pipe represented by the line 35d and through the valve passage 37d. The starboard pump 34 is by-passed in this position by a pipe represented by the line 34c, chamber 36e, pipe connection 51, chamber 37e and a pipe represented by the line 34d.

With the valves in the other extreme position, that is, in the fifth position shown in Fig. 12, the opposite condition prevails. In this case, the starboard pump 34 is operating and is connected to the cylinder 11 by the pipe 34c and through the valve passage 36d, and is connected to the cylinder 12 by the pipe 34d and through the valve passage 37d. The port pump 35 is by-passed in this position by the pipe 35c, chamber 36f, pipe connection 51, chamber 37f, and pipe 35d.

With the valves in the fourth position shown in Fig. 13, the port pump 35 is by-passed by the pipe 35c, chamber 36f, pipe connection 51, chamber 37f, and pipe 35d. The starboard pump 34 in this position is shut off by the valve portions 36g and 37g, so that it is neither by-passed nor in communication with the cylinders 11 and 12. In this position, the valve portions 36g, 36h, 37g and 37h operate to close off the cylinders 11 and 12 from both pumps, whereby oil is trapped in each of the cylinders, thereby to prevent the flow of the oil into and from the latter to apply the hydraulic brake and retain the crosshead 13 in substantially the position thereof at the time.

With the valves in the third position shown in Fig. 14, the valve portions 36g, 36h, 37g and 37h are in position to apply the hydraulic brake, as in Fig. 13. In this position, also, both pumps are by-passed. That is, the starboard pump 34 is by-passed as in Fig. 11, and the port pump 35 is by-passed as in Fig. 12.

With the valves in the second position shown in Fig. 15, the valve portions 36g, 36h, 37g and 37h are in position to apply the hydraulic brake, as in Figs. 13 and 14. In this position, the starboard pump 34 is by-passed as in Fig. 11. The port pump 35 in this position is shut off by the valve portions 36h and 37h, so that it is neither by-passed nor in communication with the cylinders 11 and 12.

In normal operation, the valves are either in position 1 as shown in Fig. 11, with the port pump operating and the starboard pump by-passed, or in position 5 as shown in Fig. 12, with the starboard pump operating and the port pump by-passed. The advantage of this over the arrangement in Figs. 7 to 10 resides in the fact that since the non-effective pump is always by-passed and also disconnected or shut off from the cylinders 11 and 12 in normal running, it can, without interfering in any way with the steering action, be started up for test purposes or for the purpose of first getting it up to speed before the lever 46 is thrown over to put it into service if the other pump fails or needs repair.

For example, if the valves are in position 1 as shown in Fig. 11, and it is desired to cut out the port pump 35 and place the starboard pump 34 in service, the latter can be started up immediately since it is by-passed. The bolt 49 is removed and the lever 46 swung over in the counter-clockwise direction.

In moving into and through position 2, shown in Fig. 15, the port pump is shut off from the cylinders and the hydraulic brake is applied to hold the crosshead 13. The starboard pump is still by-passed and shut off from the cylinders.

In moving into and through position 3 as shown in Fig. 14, the hydraulic brake is still applied and the starboard pump is still by-passed and shut off from the cylinders. The port pump is still shut off from the cylinders and is by-passed.

In moving into and through position 4, as shown in Fig. 13, the hydraulic brake is still applied and the starboard pump is still shut off from the cylinders but it is also shut off from the by-pass connection 51 so that pressure can build up. The port pump is still shut off from the cylinders and is by-passed.

In moving into position 5, as shown in Fig. 12, the hydraulic brake is removed, and the starboard pump, which is now operating up to pressure, is simultaneously placed in communication with the cylinders. The port pump is still shut off from the cylinders and is by-passed.

The bolt 49 is now put in place to hold the valves in position 5.

In changing over from the starboard pump to the port pump, the lever 46 is swung in the clockwise direction from position 5 to position 1, and the conditions just explained take place in the reverse sequence, as will be well understood.

If both pumps fail, and it is desired to steer by hand, the lever 46 is moved into and secured in position 3, to apply the hydraulic brake and by-pass both pumps. The tackle or gear for hand steering is now connected, and the valve 43, which is closed for power steering, is opened to provide the by-pass between the cylinders.

It will be understood that various modifications, other than those shown, are possible without departing from the spirit of my invention or the scope of the claims.

I claim as my invention:
1. In a steering gear, a rudder crosshead, fluid-pressure devices each connected to said crosshead and operable respectively to impart movement to said crosshead in opposite directions, a starboard pump and a port pump each of the reversible delivery type and connected to and each operable independently of the other to supply fluid under pressure to said devices selectively to impart movement one way or the other to said crosshead, each of said pumps being of the variable-stroke type, a first valve and a second valve operable jointly to control operating action of said gear, each of said pumps having a direct connection from one side thereof to said first valve, each of said pumps having a direct connection from the other side thereof to said second valve, and means common with respect to said valves for operating the same simultaneously and in unison, said valves having a given operating position in which said port pump is effective, and said starboard pump is by-passed and shut off from said devices, said valves having another operating position in which both pumps are shut off from said devices and in which only said starboard pump is by-passed and in which the fluid is trapped in said devices, said valves having still another position in which both pumps are by-passed and shut off from said devices and in which the fluid is trapped in said devices, said valves having still another position in which both pumps are shut off from said devices and in which only said port pump is by-passed and in which the fluid is trapped in said devices, said valves having still another position in which said starboard pump is effective and said port pump is by-passed and shut off from said devices.

2. In a steering gear, a rudder crosshead, fluid-pressure devices each connected to said crosshead and operable respectively to impart movement to said crosshead in opposite directions, a starboard pump and a port pump each of the reversible delivery type and each connected to and each operable independently of the other to supply fluid under pressure to said devices selectively to impart movement one way or the other to said crosshead, a first valve and a second valve each for controlling the supply of fluid to one of said fluid pressure devices, said valves having a given operating position in which said starboard pump is by-passed, said valve means having another operating position in which said port pump is by-passed, said valve means in each of said positions thereof operating to shut off both pumps from said devices and to trap the fluid in said devices.

3. In a steering gear, a rudder crosshead, fluid pressure devices each connected to said crosshead and operable respectively to impart movement to said crosshead in opposite directions, a starboard pump and a port pump each of the reversible delivery type and connected to and each operable independently of the other to supply fluid under pressure to said devices selectively to impart movement one way or the other to said crosshead, a first valve and a second valve each connected to its respective fluid pressure device and to one another, each of said pumps having a connection to each of said valves, said valves having a given operating position in which said port pump is effective and said starboard pump is by-passed and shut off from said devices, said valves having another operating position in which both pumps are shut off from said devices and in which only said starboard pump is by-passed and in which the fluid is trapped in said devices, said valves having still another position in which both pumps are by-passed and shut off from said devices and in which said fluid is trapped in said devices, said valves having still another position in which both pumps are shut off from said devices and in which only said port pump is by-passed and in which the fluid is trapped in said devices, said valves having still another position in which said starboard pump is effective and said port pump is by-passed and shut off from said devices.

RALPH ERLING.